(12) United States Patent
Okitsu et al.

(10) Patent No.: US 9,964,694 B2
(45) Date of Patent: May 8, 2018

(54) BACKLIGHT DEVICE AND DISPLAY APPARATUS

(71) Applicant: Sakai Display Products Corporation, Sakai-shi, Osaka (JP)

(72) Inventors: Motoaki Okitsu, Sakai (JP); Tomoo Sasaki, Sakai (JP); Yuki Horiguchi, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 85 days.

(21) Appl. No.: 15/037,232

(22) PCT Filed: Nov. 13, 2014

(86) PCT No.: PCT/JP2014/080102
§ 371 (c)(1),
(2) Date: May 17, 2016

(87) PCT Pub. No.: WO2015/076181
PCT Pub. Date: May 28, 2015

(65) Prior Publication Data
US 2016/0291243 A1    Oct. 6, 2016

(30) Foreign Application Priority Data

Nov. 25, 2013  (JP) ................................ 2013-243163

(51) Int. Cl.
G02F 1/1333       (2006.01)
F21V 8/00         (2006.01)
G02F 1/1335       (2006.01)

(52) U.S. Cl.
CPC ......... G02B 6/0088 (2013.01); G02B 6/0085 (2013.01); G02F 1/133308 (2013.01);
(Continued)

(58) Field of Classification Search
CPC ............... G02B 6/0085; G02B 6/0088; G02F 1/133308; G02F 2001/133311;
(Continued)

(56) References Cited

U.S. PATENT DOCUMENTS 7,142,264 B2 * 11/2006 Choi ................. G02F 1/133308
                                                         349/58
7,665,879 B2 *  2/2010 Hsieh ................ G02F 1/133604
                                                         349/58
(Continued)

FOREIGN PATENT DOCUMENTS

CN     103033966 A    4/2013
JP     2009-212056 A  9/2009
(Continued)

*Primary Examiner* — Peggy Neils
(74) *Attorney, Agent, or Firm* — Bozicevic, Field & Francis LLP; Bret E. Field

(57) ABSTRACT

A plurality of LEDs emit light to a right end surface of a light guide plate. The light guide plate emits the light from a front surface, the light being made incident on the right end surface. The heat dissipater dissipates heat generated by the plurality of LEDs. A backlight chassis supports the light guide plate. The backlight chassis includes: a cover plate for covering a rear surface of the light guide plate; and an upper wall connected to the cover plate, for covering an upper end surface of the light guide plate adjacent to the right end surface. The heat dissipater includes a right side wall for covering the right end surface of the light guide plate. The right end of the upper wall of the backlight chassis and the upper end of the right side wall of the heat dissipater are connected by a non-transparent connecting part.

3 Claims, 14 Drawing Sheets

(52) U.S. Cl.
CPC ............ *G02F 2001/133311* (2013.01); *G02F 2001/133628* (2013.01)

(58) Field of Classification Search
CPC ... G02F 2001/133628; G02F 1/133608; G02F 2001/133314; G02F 1/133602
See application file for complete search history.

(56) References Cited

U.S. PATENT DOCUMENTS

| | | | |
|---|---|---|---|
| 8,439,550 B2* | 5/2013 | Sohn | F21V 15/01 349/58 |
| 9,335,576 B2* | 5/2016 | Shin | G02F 1/133308 |
| 2011/0007236 A1 | 1/2011 | Kim et al. | |
| 2011/0090426 A1 | 4/2011 | Choi et al. | |
| 2011/0221980 A1 | 9/2011 | Kawabata et al. | |
| 2013/0088661 A1 | 4/2013 | Shin et al. | |

FOREIGN PATENT DOCUMENTS

| | | | |
|---|---|---|---|
| JP | 2011-086627 A | 4/2011 | |
| JP | 5066264 B2 | 11/2012 | |

* cited by examiner

F I G. 4
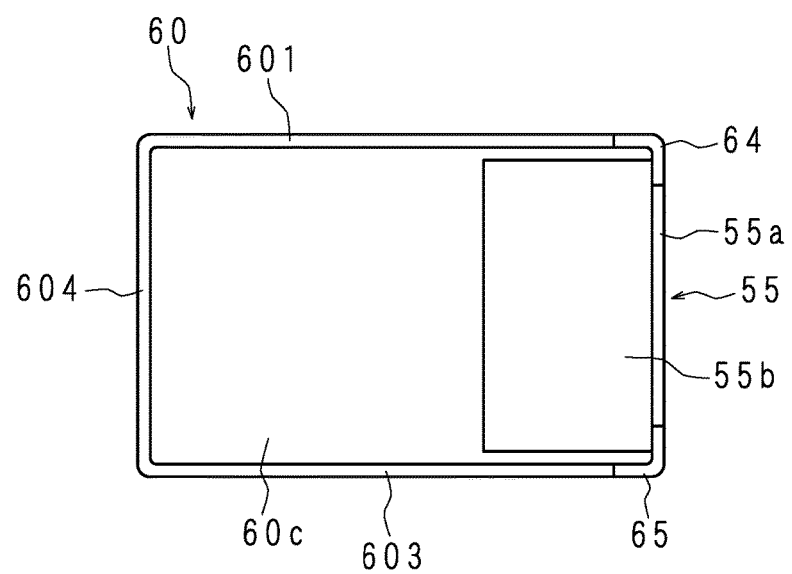

F I G. 7
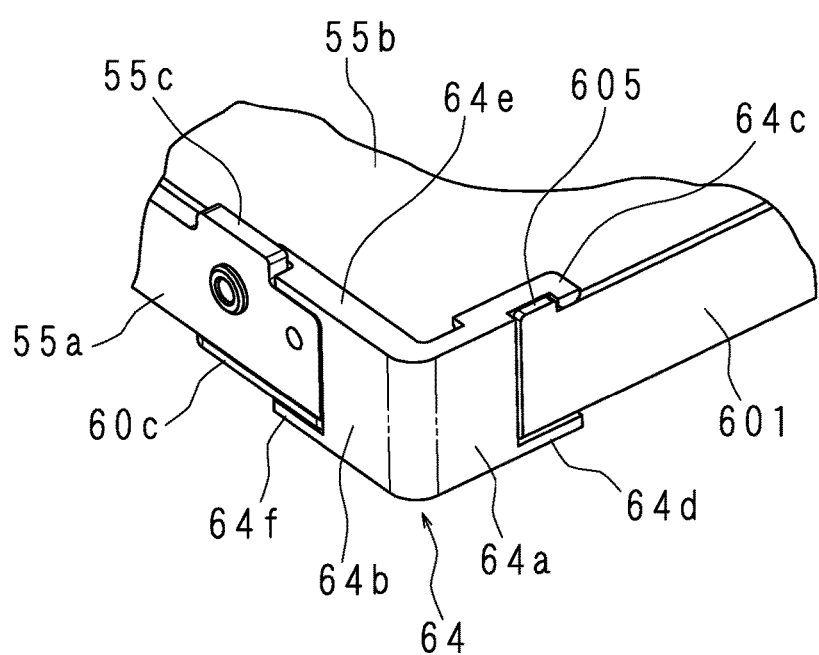

BACKLIGHT DEVICE AND DISPLAY APPARATUS

This application is the national phase under 35 U.S.C. § 371 of PCT International Application No. PCT/JP2014/080102 which has an International filing date of Nov. 13, 2014 and designated the United States of America.

FIELD

The present invention relates to a backlight device for irradiating a display panel for displaying an image with light and to a display apparatus including the backlight device.

BACKGROUND

As a backlight device for irradiating a display panel for displaying an image with light, there is a direct type backlight device in which a light source such as an LED (light emitting diode) or a cold-cathode tube is disposed at a position facing one flat plane of the display panel (for example, see Japanese Patent No. 5066264). In addition, as another backlight device, there is an edge light type backlight device having a light source which is disposed at a position facing an end surface of a light guide plate and irradiates the display panel with light from one flat surface of the light guide plate, the light being made incident on one end surface of the light guide plate from the light source.

Currently, as a display apparatus including the display panel and the backlight device for irradiating the display panel with light, a thin type display apparatus is required. As a conventional edge light type backlight device included in the thin type display apparatus, there is a backlight device including: a backlight chassis for supporting a rectangular light guide plate and for covering the other flat surface of the light guide plate and end surfaces of the light guide plate except for one end surface on which light is made incident from a light source; and a heat dissipater for covering the one end surface of the light guide plate and for dissipating heat of the light source. In the conventional backlight device, a box body, in which one surface facing the one flat surface of the light guide plate is open, is formed by the backlight chassis and the heat dissipater, and the box body houses the light guide plate.

In the conventional display apparatus including the conventional backlight device as described above, in a state in which the rectangular display panel is disposed so that the one surface of the rectangular display panel faces the one flat surface of the light guide plate, a peripheral edge portion of the other surface of the display panel and side walls of the box body formed by the backlight chassis and the heat dissipater are covered with a bezel.

SUMMARY

However, in the above-described conventional display apparatus, a gap occurs in corner portions of the box body formed by the backlight chassis and the heat dissipater. Therefore, there is a problem that the light emitted by the light source is leaked from the gap and a problem that dust enters inside of the box body from an outside of the box body.

As a configuration for solving these problems, a configuration in which black polyester tapes are stuck to the corner portions of the bezel may be considered. However, in this configuration, there is a problem that sticking the tapes so as to reliably prevent the light leakage and entering of dust is difficult, a problem that an appearance of the display apparatus is deteriorated due to wrinkles formed in the tape and a problem that re-sticking of the tape is impossible.

Further, in both of the direct type and the edge light type backlight devices, a gap occurs in the corner portions of the backlight chassis, when the backlight chassis is formed in a box body shape, one surface of which is open, and is constituted by: a support plate for supporting a light source unit for emitting light to the display panel; and a plurality of plate parts protruding from the edge portion of each side of the support plate in the same direction.

Also in this case, there is a problem that the light emitted by the light source is leaked from the gap and a problem that dust enters inside of the box body from the outside of the box body. In order to solve these problems, the configuration of sticking the black polyester tapes to the corner portions of the bezel is not realistic.

The present invention has been made in view of such a situation, and the object thereof is to provide: a backlight device which can prevent light leakage and entering of dust without using a tape; and a display apparatus including the backlight device.

A backlight device according to one embodiment of the present invention includes: a light guide plate for emitting light from one flat surface of the light guide plate, the light being made incident on one end surface of the light guide plate; a light source for emitting the light to the one end surface of the light guide plate; a heat dissipater for dissipating heat generated by the light source; and a support body for supporting the light guide plate. The support body includes: a cover plate for covering the other flat surface, opposite to the one flat surface, of the light guide plate; and a side wall provided continuously to the cover plate, for covering an end surface of the light guide plate adjacent to the one end surface of the light guide plate. The heat dissipater includes a side wall for covering the one end surface of the light guide plate. The backlight device further includes a non-transparent connecting part for connecting adjacent one ends of the respective side walls of the support body and the heat dissipater.

According to the embodiment of the present invention, the light source, for example, an LED, emits light to the one end surface of the light guide plate, and the light guide plate emits light from the one flat surface, the light being made incident on the one end surface. The heat generated by the light source is dissipated by the heat dissipater, and the light guide plate is supported by the support body, for example, a backlight chassis. The cover plate of the support body covers the other flat surface of the light guide plate which is opposite to the one flat surface of the light guide plate, and the side wall of the support body provided continuously to the cover plate covers the end surface of the light guide plate adjacent to the one end surface. In addition, the side wall of the heat dissipater covers the one end surface of the light guide plate on which the light is made incident from the light source. The non-transparent connecting part connects the adjacent one ends of the respective side walls of the support body and the heat dissipater.

Thereby, a gap does not occur between the support body and the heat dissipater so that light leakage and entering of dust are prevented without using a tape.

In the backlight device according to the embodiment of the present invention, it is preferred that the connecting part clamps and holds the respective side walls of the support body and the heat dissipater in a direction perpendicular to the one flat surface.

According to the embodiment of the present invention, the connecting part clamps and holds the side wall of the support body in the direction perpendicular to the one flat surface of the light guide plate. Further, the connecting part clamps and holds the side wall of the heat dissipater in the same direction. Therefore, it is possible to prevent the support body and the heat dissipater from moving in the direction perpendicular to the one flat surface of the light guide plate, without using a fixture, for example, screws.

In the backlight device according to the embodiment of the present invention, it is preferred that the connecting part is in contact with the respective side walls of the support body and the heat dissipater from the side close to the light guide plate.

According to the embodiment of the present invention, a portion of the connecting part is in contact with the side wall of the support body from the side close to the light guide plate, and another portion of the connecting part is in contact with the side wall of the heat dissipater from the side close to the light guide plate. Therefore, the connecting part does not rotate in a direction perpendicular to the side wall of the support body and in a direction perpendicular to the side wall of the heat dissipater so that the connecting part is reliably fixed between the one ends of the respective side walls of the support body and the heat dissipater.

A backlight device according to one embodiment of the present invention includes: a light source unit for emitting light; a support plate for supporting the light source unit; and two plate parts protruding, in the same direction, from respective edge portions of adjacent two sides of the support plate. The backlight device further includes a non-transparent connecting part for connecting adjacent respective one ends of the two plate parts.

According to the embodiment of the present invention, the light source unit for emitting light is supported by the support plate formed in, for example, a rectangular shape. The two plate parts protrude, in the same direction, from the respective edge portions of the adjacent two sides of the support plate. The adjacent respective one ends of the two plate parts are connected by the non-transparent connecting part.

Thereby, a gap does not occur between the two plate parts so that the light leakage and entering of dust are prevented without using a tape.

A display apparatus according to one embodiment of the present invention includes: a display panel for displaying an image; and the above-described backlight device for irradiating the display panel with light.

According to the embodiment of the present invention, the display panel displays an image using the light irradiated by the above-described backlight device.

According to the embodiment of the present invention, it is possible to prevent the light leakage and entering of dust without using a tape.

The above and further objects and features will move fully be apparent from the following detailed description with accompanying drawings.

BRIEF DESCRIPTION OF THE DRAWINGS

FIG. 4 is a front view of a box body for housing a light guide plate;

FIG. 7 is a perspective view of a corner portion of the box body as seen from an outside;

DETAILED DESCRIPTION OF NON-LIMITING EXAMPLE EMBODIMENTS

Hereinafter, the present invention will be described in detail with reference to the accompanying drawings illustrating embodiments thereof.

Embodiment 1

Figure 1:
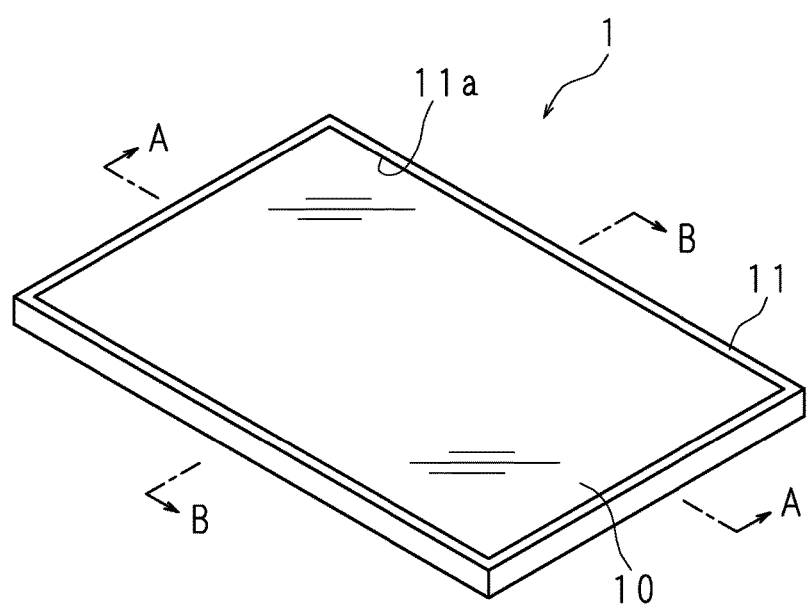
FIG. 1 is a view illustrating an appearance of a display apparatus according to Embodiment 1.

FIG. 1 is a view illustrating an appearance of a display apparatus according to Embodiment 1. The display apparatus 1 includes a display panel 10 of a rectangular-plate shape having a display surface for displaying an image on a front side. A front peripheral edge portion of the display panel 10 is covered by a bezel 11 of a rectangular-frame shape having an opening 11a at a central portion of the bezel 11. In the display panel 10, an effective display region located at the central portion of the display surface is exposed from the opening 11a.

Here, vertical and horizontal dimensions of the opening 11a are slightly smaller than the vertical and horizontal dimensions of the display panel 10 so that the bezel 11 can cover the periphery of the display panel 10.

Figure 2:
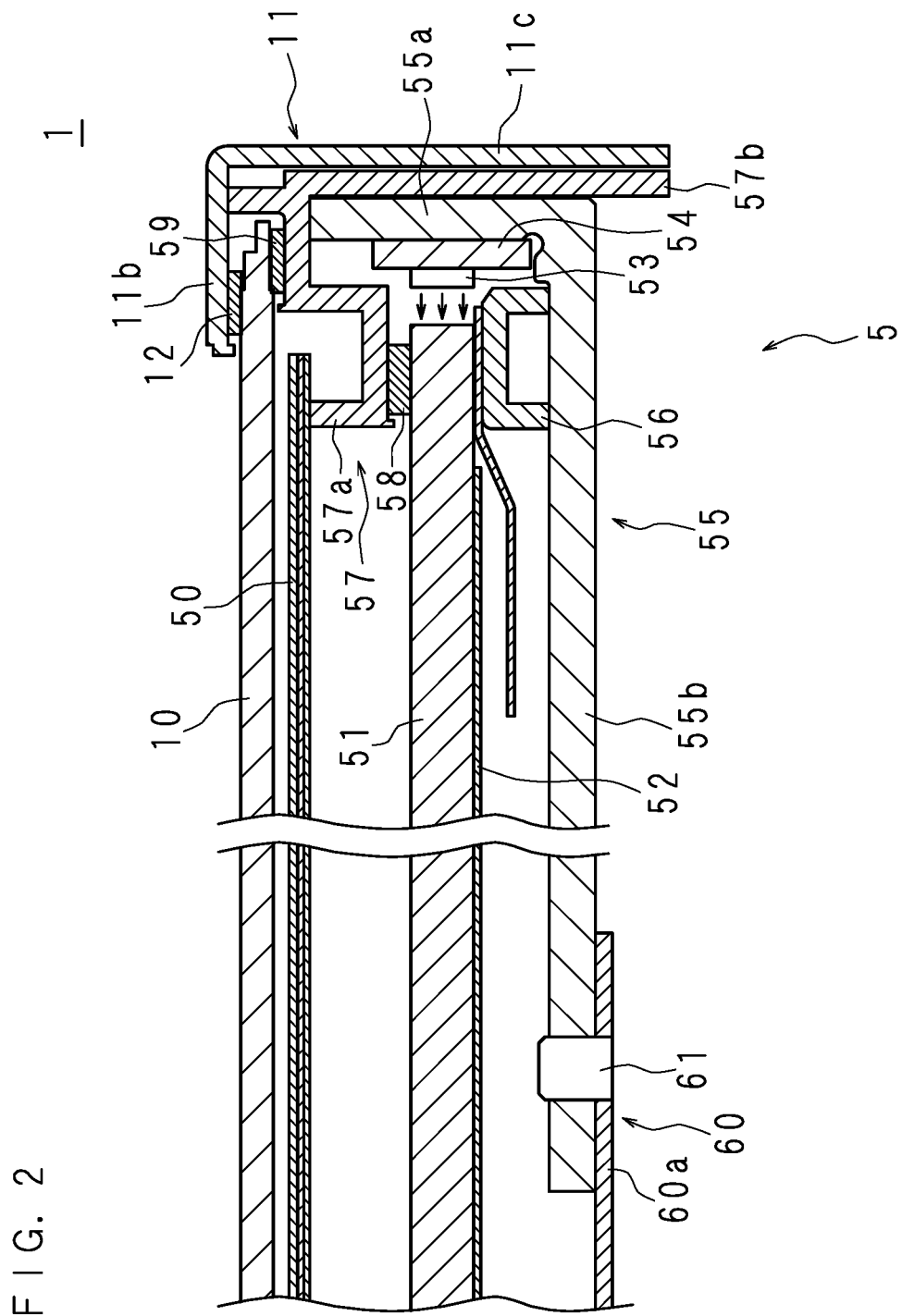
FIG. 2 is a partial cross-sectional view taken on line A-A in FIG. 1.
Figure 3:
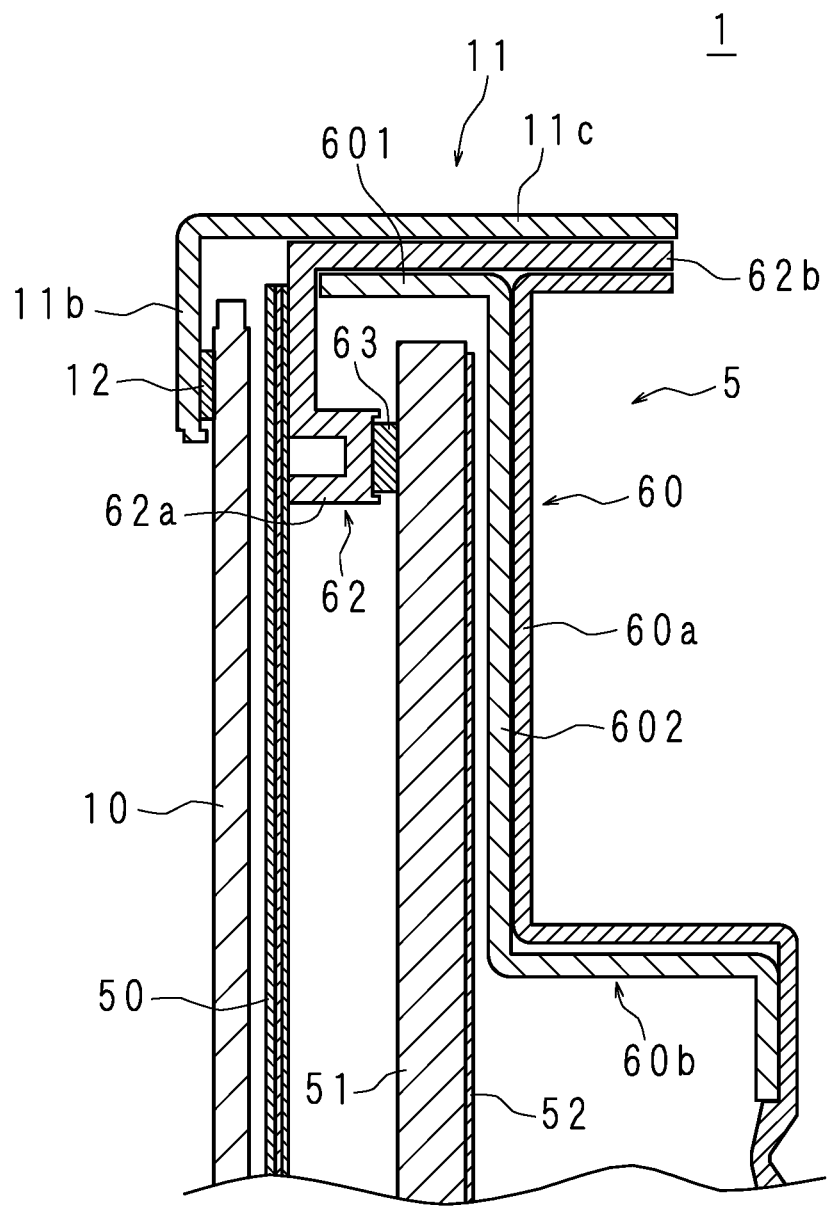
FIG. 3 is a partial cross-sectional view taken on line B-B in FIG. 1.

FIGS. 2 and 3 are partial cross-sectional views taken on lines A-A and B-B in FIG. 1, respectively. The bezel 11 has a cross section formed in an L shape. The bezel 11 has: a front wall 11b for covering the front peripheral edge portion of the display panel 10; and a peripheral wall 11c provided continuously to the front wall 11b, for covering an end surface of the display panel 10. A buffer material 12 is disposed between the front wall 11b of the bezel 11 and the peripheral edge portion of the display panel 10.

The display apparatus 1 further includes a backlight device 5 on a rear side of the display panel 10. The backlight device 5 performs irradiation of light from the rear side of the display panel 10 to the front side. The backlight device 5 irradiates the rear side of the display panel 10 with light so that the display panel 10 displays an image on the display surface. The display panel 10 is, for example, a liquid crystal panel.

The backlight device 5 includes a rectangular optical sheet 50, a rectangular light guide plate 51, a rectangular reflection sheet 52, and a plurality of LEDs 53. The optical sheet 50 is formed by laminating a plurality of sheets, which perform various optical functions, such as a view expansion sheet, an anti-reflection sheet, and the like. The optical sheet 50 is disposed so that one surface of the optical sheet 50 faces a rear surface of the display panel 10.

The light guide plate 51 is disposed on the rear side of the optical sheet 50. A front surface (one flat surface) of the light guide plate 51 faces the optical sheet 50. A rear surface (the other flat surface) of the light guide plate 51 is in close contact with the reflection sheet 52. The plurality of LEDs 53 are arranged at positions facing a right end surface (a right side of FIG. 2) of the light guide plate 51 in a vertical direction (a direction perpendicular to the paper surface of FIG. 2), specifically, in a longitudinal direction of the right end surface of the light guide plate 51.

Each of the plurality of LEDs 53 functions as a light source and emits light in a direction indicated by arrows. The light emitted by each of the plurality of LEDs 53 is made incident on the right end surface of the light guide plate 51. The light guide plate 51 is made of, for example, an acrylic resin. The light made incident on the right end surface of the light guide plate 51 is repeatedly reflected on the front and rear surfaces. In a case where the light propagating through the light guide plate 51 is reflected on the front surface of the light guide plate 51, a part of the light emits to the optical sheet 50. The rear surface of the light guide plate 51 is in close contact with the reflection sheet 52 so that all the light propagating through the light guide plate 51 is reflected on the rear surface. Thereby, the light guide plate 51 uniformly emits light from the front side to the optical sheet 50.

A rectangular LED substrate 54 is disposed on a right side of the plurality of LEDs 53. A left surface of the LED substrate 54 faces the right end surface of the light guide plate 51. The plurality of LEDs 53 are mounted on the left surface of the LED substrate 54. A right surface of the LED substrate 54 is in close contact with a heat dissipater 55. Heat generated by the plurality of LEDs 53 due to emittance of light is conducted to the heat dissipater 55 through the LED substrate 54.

The heat dissipater 55 has a cross section formed in an L shape. The heat dissipater 55 has: a rectangular right side wall 55a, which is in close contact with the LED substrate 54, for covering the right end surface of the light guide plate 51; and a rectangular rear wall 55b provided continuously to one side of the right side wall 55a and disposed so that one surface of the rear wall 55b faces the rear surface of the light guide plate 51. The rear wall 55b of the heat dissipater 55 is exposed to ambient air. The heat generated by the plurality of LEDs 53 is conducted to the rear wall 55b through the LED substrate 54 and the right side wall 55a, and is discharged from the rear wall 55b into the ambient air.

A spacer 56 is disposed between an edge portion of a right side, that is, the side, close to the LED 53, of the light guide plate 51 and the rear wall 55b of the heat dissipater 55. Further, a pressing member 57 is disposed on the front side of a right edge portion of the light guide plate 51 and presses the right edge portion of the light guide plate 51 while clamping and holding the right edge portion with the spacer 56. The pressing member 57 has: a front wall 57a for covering the front side of the right edge portion of the light guide plate 51; and a right wall 57b provided continuously to the front wall 57a, for covering the right end surface of the light guide plate 51 from a right side of the right side wall 55a of the heat dissipater 55. A buffer material 58 is disposed between the right edge portion of the light guide plate 51 and the front wall 57a of the pressing member 57.

The front wall 57a of the pressing member 57 supports respective right end portions of the optical sheet 50 and the display panel 10. A buffer material 59 is disposed between the front wall 57a and the display panel 10. The peripheral wall 11c of the bezel 11 covers the right end surface of the light guide plate 51 from the right side of the right wall 57b of the pressing member 57.

The backlight device 5 further includes a backlight chassis 60 as a support body for supporting the light guide plate 51. The backlight chassis 60 has a rear wall 60a for covering the rear surface of the light guide plate 51. The rear wall 60a of the backlight chassis 60 is connected with the rear wall 55b of the heat dissipater 55 by a fixture 61. The backlight chassis 60 further has a reinforcing angle 60b for covering: an upper end surface (the upper side of FIG. 3) of the light guide plate 51; and the rear side of an upper edge portion of the light guide plate 51. The reinforcing angle 60b is fixed with being superimposed to the rear wall 60a. The reinforcing angle 60b has: a rectangular upper wall 601 for covering the upper end surface of the light guide plate 51; and a rear wall 602 provided continuously to one side of the upper wall 601, for covering the upper edge portion of the light guide plate 51. Regarding the backlight chassis 60, the rear wall 60a, the rear wall 602 of the reinforcing angle 60b, and a rear wall of the reinforcing angle (not illustrated) disposed on a lower side as described below form a cover plate 60c (see FIG. 4) for covering the rear surface of the light guide plate 51. Accordingly, the upper wall 601 of the reinforcing angle 60b is provided continuously to the cover plate 60c and functions as a side wall for covering the upper end surface of the light guide plate 51 adjacent to the right end surface of the light guide plate 51.

It is noted that the cover plate 60c is formed by: the rear walls of three reinforcing angles disposed on the upper, lower and left sides respectively; and the rear wall 60a, in a case where the reinforcing angle similar to the reinforcing angle 60b is disposed on the left side of the backlight chassis 60.

The rear wall 602 of the reinforcing angle 60b supports respective upper edge portions of the light guide plate 51 and the reflection sheet 52. A pressing member 62 is disposed on the front side of the upper edge portion of the light guide plate 51 and presses the upper edge portion of the light guide plate 51 while clamping and holding the upper edge portion with the rear wall 602 of the reinforcing angle 60b. The pressing member 62 has: a front wall 62a for covering the front side of the upper edge portion of the light guide plate 51; and an upper wall 62b provided continuously to the front wall 62a, for covering the upper end surface of the light guide plate 51 from the upper side of the upper wall 601 of the reinforcing angle 60b. A buffer material 63 is disposed between the upper edge portion of the light guide plate 51 and the front wall 62a of the pressing member 62. The peripheral wall 11c of the bezel 11 covers the upper end surface of the light guide plate 51 from the upper side of the upper wall 62b of the pressing member 62. The front wall 62a of the pressing member 62 supports the respective upper edge portions of the optical sheet 50 and the display panel 10.

A configuration of a lower portion of the display apparatus 1 is similar to the configuration of the upper portion and is a configuration in which the configuration of the upper portion is vertically reversed.

Figure 5:
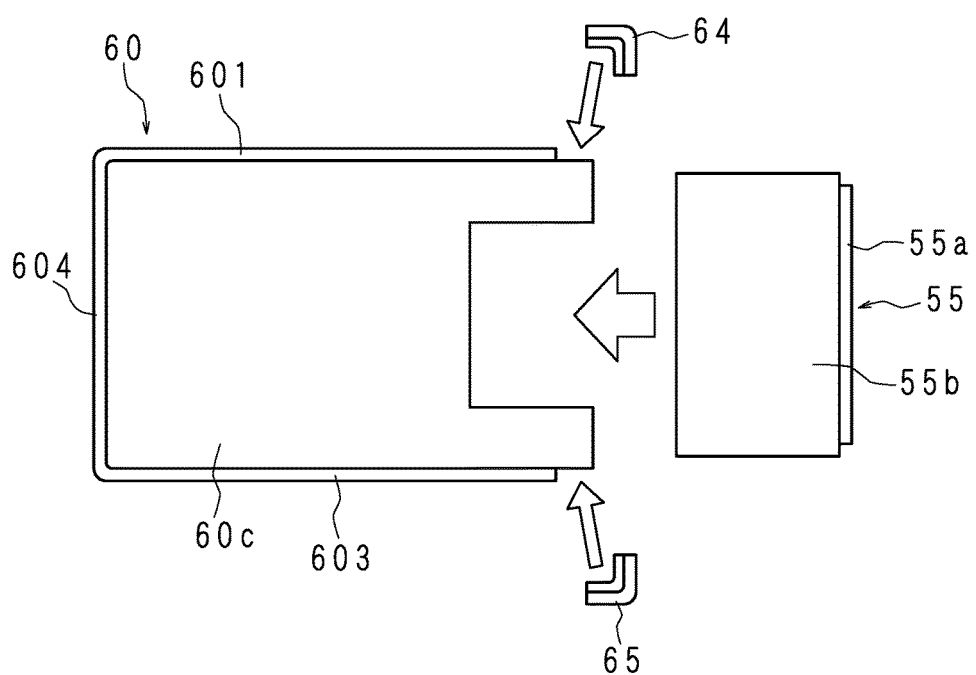
FIG. 5 is an explanatory view for describing assembling of the box body for housing the light guide plate.

FIG. 4 is a front view of a box body for housing the light guide plate 51, and FIG. 5 is an explanatory view for describing assembling of the box body for housing the light guide plate 51. As described above, the backlight chassis 60 has the upper wall 601 for covering the upper end surface of the light guide plate 51. Similarly, the backlight chassis 60 has a lower wall 603 and a left wall 604 which are provided continuously to the cover plate 60c and cover a lower end surface and a left end surface of the light guide plate 51, respectively. Each of the lower wall 603 and the left wall 604 is formed in a rectangular shape. The upper wall 601, the lower wall 603 and the left wall 604 of the backlight chassis 60 are continued to one another.

The backlight chassis 60 is fixed in a state in which a portion of the cover plate 60c is overlapped with the rear side of the rear wall 55b of the heat dissipater 55. The right end of the upper wall 601 of the backlight chassis 60 and the upper end of the right side wall 55a of the heat dissipater 55 are connected by a non-transparent connecting part 64. The right end of the lower wall 603 of the backlight chassis 60 and the lower end of the right side wall 55a of the heat dissipater 55 are connected by a non-transparent connecting part 65. As described above, the backlight device 5 further includes: the connecting part 64 for connecting adjacent respective one ends of the upper wall 601 and the right side wall 55a; and the connecting part 65 for connecting adjacent respective one ends of the lower wall 603 and the right side wall 55a. In the display apparatus 1, the light guide plate 51 is housed in the box body formed by the heat dissipater 55, the backlight chassis 60 and the connecting parts 64 and 65.

The right side wall 55a of the heat dissipater 55, and the upper wall 601 and lower wall 603 of the backlight chassis 60 are connected by the connecting parts 64 and 65 so that a gap does not occur between the heat dissipater 55 and the backlight chassis 60. Thereby, it is prevented that light emitted by the plurality of LEDs 53 from a space between the heat dissipater 55 and the backlight chassis 60. Furthermore, it is also prevented that dust enters from the space between the heat dissipater 55 and the backlight chassis 60. Since light leakage and entering of dust are prevented, there is no need to stick a non-transparent tape to the bezel 11.

Figure 6:
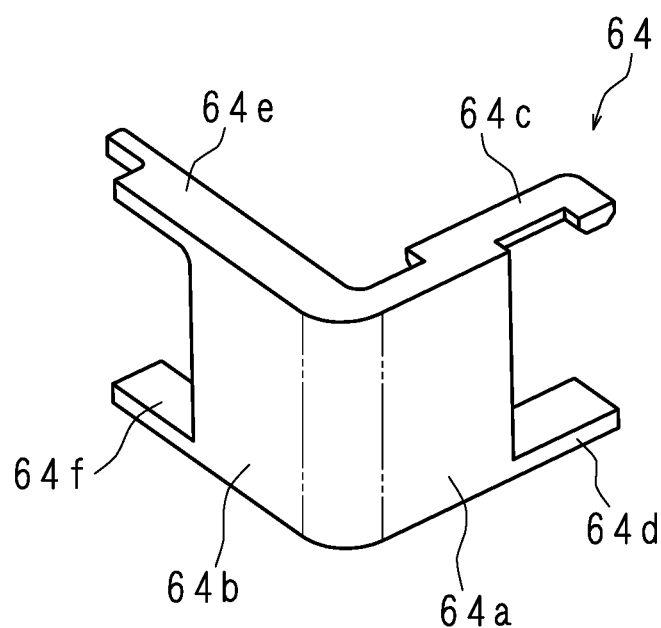
FIG. 6 is a perspective view of a connecting part.

FIG. 6 is a perspective view of the connecting part 64. The connecting part 64 has two rectangular plate parts 64a and 64b, and one long side of the plate part 64a is integrally formed with one long side of the plate part 64b. The connecting part 64 is formed in an L shape as a whole. The plate part 64a is provided with two protrusion parts 64c and 64d protruding from both end portions of the other long side of the plate part 64a in a short-length direction of the plate part 64a. The protrusion part 64c is formed in a hook shape. In addition, the plate part 64b is provided with two protrusion parts 64e and 64f protruding from both end portions of the other long side of the plate part 64b in a short-length direction of the plate part 64b. The protrusion part 64e is provided with a notch on an outside of a tip portion thereof.

The connecting part 65 is constituted in the similar manner to the connecting part 64.

Figure 8:
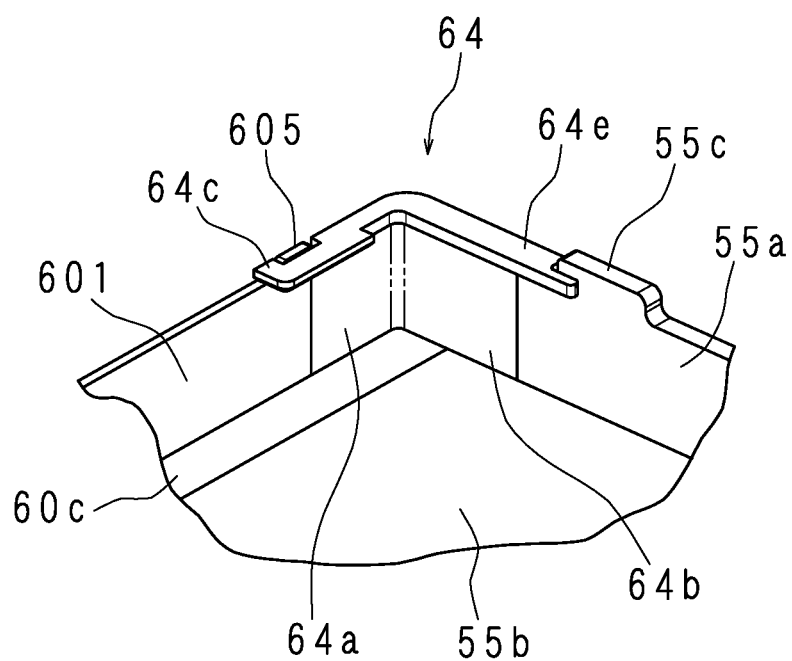
FIG. 8 is a perspective view of the corner portion of the box body as seen from an inside.

FIGS. 7 and 8 are perspective views of a corner portion of the box body as seen from the outside and inside, respectively. In a case where the box body is formed by the heat dissipater 55, the backlight chassis 60 and the connecting parts 64 and 65, the protrusion parts 64c and 64e of the connecting part 64 are located on the front side and the protrusion parts 64d and 64f of the connecting part 64 are located on the rear side, as illustrated in FIGS. 7 and 8.

In addition, in the backlight chassis 60, the right end portion of the upper wall 601 is provided with a protrusion 605 protruding to the front side, that is, to the side close to the display panel 10. The protrusion part 64c, having a hook shape, of the connecting part 64 is engaged with the protrusion 605 of the upper wall 601. Here, the protrusion part 64c is in contact with the protrusion 605 from the inside thereof, that is, the side close to the light guide plate 51. In addition, the protrusion parts 64c and 64d of the connecting part 64 clamp and hold the upper wall 601 of the backlight chassis 60 in a front-rear direction, that is, in a direction perpendicular to the front surface of the light guide plate 51.

Further, the upper end portion of the right side wall 55a of the heat dissipater 55 is also provided with a protrusion 55c protruding to the front side. The notch provided in the tip portion of the protrusion part 64e of the connecting part 64 abuts the protrusion 55c of the right side wall 55a. The protrusion part 64e is in contact with the protrusion 55c from the inside thereof, that is, the side close to the light guide plate 51. Furthermore, the protrusion parts 64e and 64f of the connecting part 64 clamp and hold the right side wall 55a of the heat dissipater 55 in the front-rear direction, that is, in the direction perpendicular to the front surface of the light guide plate 51.

In the backlight device 5 constituted as described above, the connecting part 64 clamps and holds the upper wall 601 of the backlight chassis 60 and the right side wall 55a of the heat dissipater 55 in the front-rear direction. Therefore, it is possible to prevent the backlight chassis 60 and the heat dissipater 55 from moving in the front-rear direction, without using the fixture, for example, screws. In addition, the protrusion part 64c of the connecting part 64 is in contact with the backlight chassis 60 from the inside of the upper wall 601, and the protrusion part 64e of the connecting part 64 is in contact with the heat dissipater 55 from the inside of the right side wall 55a. Therefore, the connecting part 64 does not rotate in a direction perpendicular to one surface of the plate part 64a or the plate part 64b. As a result, the connecting part 64 is reliably fixed between the right end of the upper wall 601 of the backlight chassis 60 and the upper end of the right side wall 55a of the heat dissipater 55.

Further, the connecting part 64 covers: the rear side of the upper edge portion of the right side wall 55a of the heat dissipater 55; and the rear side of the right edge portion of the upper wall 601 of the backlight chassis 60. Therefore, the light leakage and entering of dust from the corner portion of the display apparatus 1 are more reliably prevented.

The corner portion formed by the heat dissipater 55, the backlight chassis 60 and the connecting part 65 is constituted in the similar manner to the corner portion formed by the heat dissipater 55, the backlight chassis 60 and the connecting part 64. Here, in the backlight chassis 60, the right end portion of the lower wall 603 is provided with a protrusion corresponding to the protrusion 605 provided on the right end portion of the upper wall 601. The lower end portion of the right side wall 55a of the heat dissipater 55 is provided with a protrusion corresponding to the protrusion 55c provided on the upper end portion. Similar to the connecting part 64, the connecting part 65 connects the lower end of the right side wall 55a of the heat dissipater 55 and the right end of the lower wall 603 of the backlight chassis 60.

The connecting part 65 performs connection so as to obtain the similar effect to the effect obtained in the case where the connecting part 64 performs connection.

Figure 9:
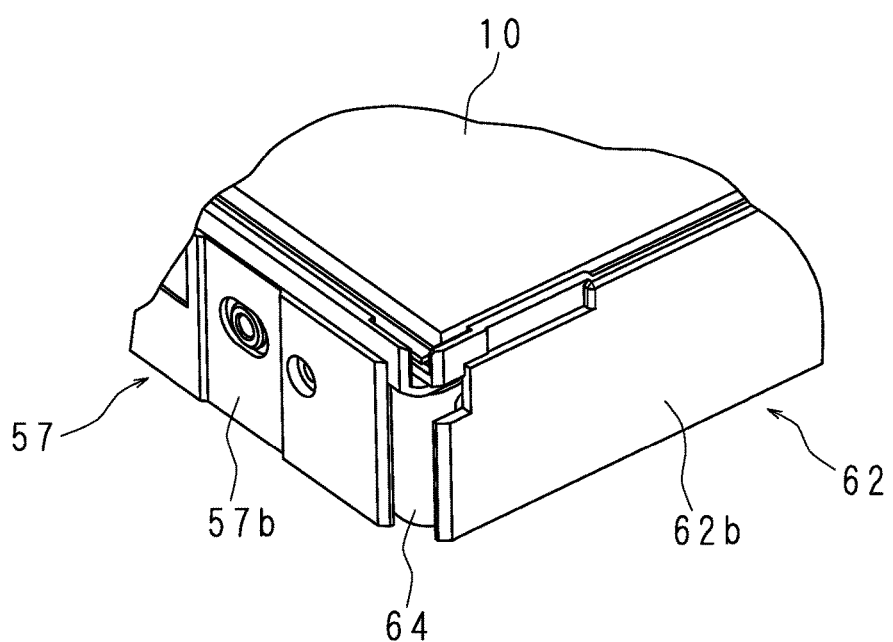
FIG. 9 is a partial perspective view of the display apparatus from which a bezel is removed.

FIG. 9 is a partial perspective view of the display apparatus 1 from which the bezel 11 is removed. FIG. 9 illustrates the configuration in which the light guide plate 51 and the like are housed in the box body illustrated in FIGS. 7 and 8, and the pressing members 57 and 62 and the display panel 10 are disposed. The pressing member 57 is disposed so that the right wall 57b covers the right side of the right side wall 55a of the heat dissipater 55. The pressing member 62 is disposed so that the upper wall 62b covers the upper side of the upper wall 601 of the backlight chassis 60. In the backlight chassis 60, the pressing members are disposed in the similar manner so as to cover the lower side of the lower wall 603 and the left side of the left wall 604, respectively. The four pressing members included in the display apparatus 1 are individually manufactured by extrusion molding, for example. The optical sheet 50 and the display panel 10 are disposed on the front side of the four pressing members included in the display apparatus 1.

Figure 10:
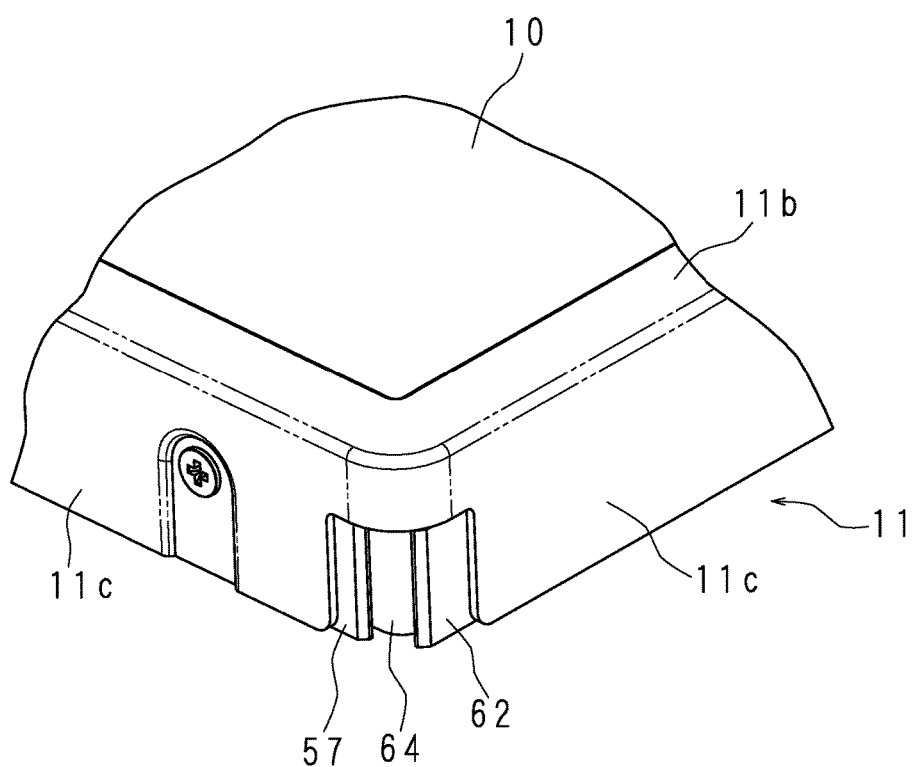
FIG. 10 is a partial perspective view of the display apparatus.

FIG. 10 is a partial perspective view of the display apparatus 1. The display apparatus 1 is manufactured by disposing the bezel 11 after the pressing members 57 and 62, the display panel 10, and the like are disposed as illustrated in FIG. 9. Here, the peripheral wall 11c of the bezel 11 covers the pressing members 57 and 62, specifically, the right wall 57b of the pressing member 57 and the upper wall 62b of the pressing member 62. The peripheral wall 11c of the bezel 11 also covers the lower side of the lower wall 603 and the left side of the left wall 604 of the backlight chassis 60. As illustrated in FIG. 10, the connecting part 64 is installed in the display apparatus 1. Therefore, a gap from which the light of the plurality of LEDs 53 is leaked, or a gap from which the dust enters does not occur in the upper right corner portion. Similarly, the connecting part 65 is installed. Therefore, the gap from which the light of the plurality of LEDs 53 is leaked, or the gap from which the dust enters does not also occur in the lower right corner portion.

It is noted that the connecting part 64 may not be in contact with the backlight chassis 60 from the inside of the upper wall 601 and the heat dissipater 55 from the inside of the right side wall 55a. Similarly, the connecting part 65 may not be in contact with the backlight chassis 60 from the inside of the lower wall 603 and the heat dissipater 55 from the inside of the right side wall 55a. Furthermore, the connecting part 64 may not clamp and hold the upper wall 601 of the backlight chassis 60 and the right side wall 55a of the heat dissipater 55. The connecting part 65 may not clamp and hold the lower wall 603 of the backlight chassis 60 and the right side wall 55a of the heat dissipater 55. Even in the above-described cases, the backlight chassis 60 and the heat dissipater 55 are connected by the connecting parts 64 and 65 so that it is possible to prevent the light leakage and entering of dust.

In addition, the display apparatus 1 may not include both of the connecting parts 64 and 65. For example, the connecting part 64 may be provided at an upper right portion of the display apparatus 1 having a high probability of the light leakage and entering of dust, and the connecting part may not be provided at a lower right portion of the display apparatus 1 having a low probability of the light leakage and entering of dust.

In addition, the backlight device capable of being applied to the invention described in Embodiment 1 is not only the backlight device 5 in which light is made incident on the right end surface of the light guide plate 51. The invention described in Embodiment 1 may be applied to a backlight device in which light is made incident on at least one of the upper end surface, the left end surface and the lower end surface of the light guide plate 51, and an assembly of the backlight chassis and the heat dissipater forms the box body.

Embodiment 2

Figure 11:
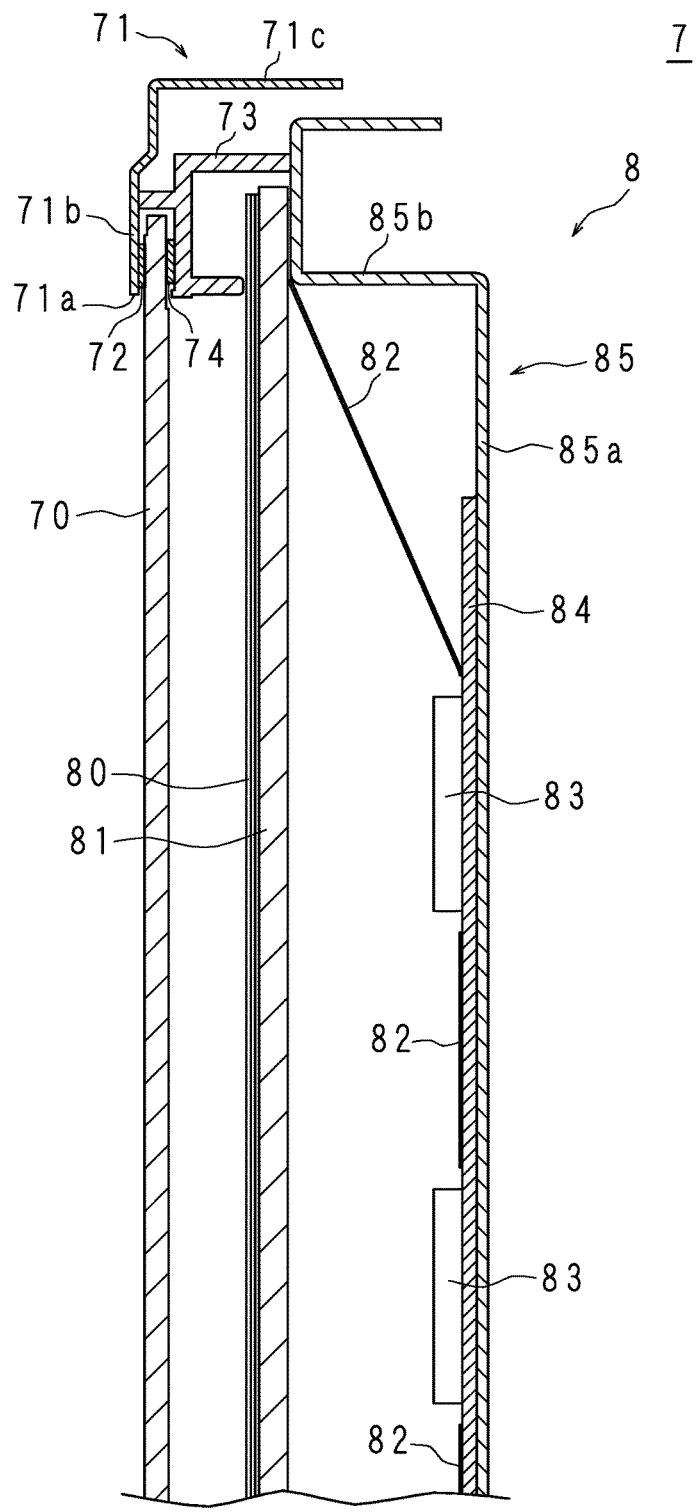
FIG. 11 is a longitudinal-sectional view illustrating partially a display apparatus according to Embodiment 2.

FIG. 11 is a longitudinal-sectional view illustrating partially a display apparatus according to Embodiment 2. The display apparatus 7 includes a direct type backlight device 8. In this regard, the display apparatus 7 is different from the display apparatus 1 of Embodiment 1 including the edge light type backlight device 5. Hereinafter, the display apparatus 7 according to Embodiment 2 will be described.

Similar to the appearance of the display apparatus 1 illustrated in FIG. 1, the display apparatus 7 includes a display panel 70 of a rectangular-plate shape having a display surface for displaying an image on a front side. A front peripheral edge portion of the display panel 70 is covered by a bezel 71 of a rectangular-frame shape having an opening 71a at a central portion of the bezel 71. Herein, the display panel 70, the bezel 71 and the opening 71a of the display apparatus 7 correspond to the display panel 10, the bezel 11 and the opening 11a of the display apparatus 1, respectively.

The vertical and horizontal dimensions of the opening 71a are slightly smaller than the vertical and horizontal dimensions of the display panel 70 so that the bezel 71 can cover the periphery of the display panel 70.

The bezel 71 has a cross section formed in an L shape. The bezel 71 has: a front wall 71b for covering the front peripheral edge portion of the display panel 70; and a peripheral wall 71c provided continuously to the front wall 71b, for covering an end surface of the display panel 70. A buffer material 72 is disposed between the front wall 71b of the bezel 71 and the display panel 70.

The display apparatus 7 further includes a backlight device 8 on a rear side of the display panel 70. The backlight device 8 performs irradiation of light from the rear side of the display panel 70 to the front side. The backlight device 8 irradiates the rear side of the display panel 70 with light so that the display panel 10 displays an image on the display surface. The display panel 70 is, for example, a liquid crystal panel.

The backlight device 8 includes a rectangular optical sheet 80, a rectangular diffusion plate 81, a reflection sheet 82, and a plurality of LEDs 83. The optical sheet 80 is constituted in the similar manner to the optical sheet 50 according to Embodiment 1 and is disposed so that one surface of the optical sheet 80 faces a rear surface of the display panel 70.

A diffusion plate 81 is disposed on the rear side of the optical sheet 80 and a front surface of the diffusion plate 81 is in close contact with the rear surface of the optical sheet 80. A plurality of LEDs 83 are arranged on the rear side of the diffusion plate 81 in a width direction and a longitudinal direction of the diffusion plate 81 so as to be placed in a grid shape. A rectangular LED substrate 84 is disposed on a rear side of the plurality of LEDs 83, and the plurality of LEDs 83 are installed on a front surface of the LED substrate 84. Further, a portion of the front surface of the LED substrate 84 except for portions in which the plurality of LEDs 83 are disposed is covered by a reflection sheet 82. The reflection sheet 82 reflects light emitted by the plurality of LEDs 83.

The light emitted by the plurality of LEDs 83 and the light reflected by the reflection sheet 82 are made incident on the rear surface of the diffusion plate 81. The diffusion plate 81 diffuses the light made incident on the rear surface and emits the uniform light to the rear surface of the display panel 70 through the optical sheet 80. As described above, the optical sheet 80, the diffusion plate 81, the reflection sheet 82 and the plurality of LEDs 83 function as a light source unit for emitting the light to the rear surface of the display panel 70.

The backlight device 8 further includes a backlight chassis 85. The backlight chassis 85 is formed in a box body shape, one surface of which is open, and houses the plurality of LEDs 83 and the LED substrate 84. The backlight chassis 85 has a rectangular support plate 85*a* for supporting the above-described light source unit on the rear side of the LED substrate 84 in a state in which the support plate 85 is in close contact with the LED substrate 84. In the backlight chassis 85, an upper plate part 85*b* protrudes from an edge portion of an upper side (the upper side of FIG. 11) of the support plate 85*a* to the front side. The upper plate part 85*b* has a cross section formed in a U shape as illustrated in FIG. 11. The upper plate part 85*b* is provided with: a side plate portion of a rectangular shape for covering the plurality of LEDs 83 and an end surface of the LED substrate 84; and a rectangular extending portion extending from the side plate portion to the outside of the display apparatus 7. A front surface of the extending portion faces the rear surface of the diffusion plate 81.

The edge portions of the upper sides of the reflection sheet 82, the diffusion plate 81 and the optical sheet 80 are laminated on the front side of the extending portion of the upper plate part 85*b* from the rear side in this order. A pressing member 73 for pressing the edge portions of the upper sides of these is disposed on the front side of the optical sheet 80. The edge portions of the upper sides of the reflection sheet 82, the diffusion plate 81 and the optical sheet 80 are clamped and held by the pressing member 73 and the extending portion of the upper plate part 85*b* of the backlight chassis 85. Further, the display panel 70 is disposed on the front side of the pressing member 73 through a buffer material 74. The display panel 70 is clamped and held by the front wall 71*b* of the bezel 71 and the pressing member 73.

In the display apparatus 7, a lower portion of the display apparatus 7 is formed in a shape in which the cross section of the upper portion illustrated in FIG. 11 is vertically reversed. A transverse section of the display apparatus 7 in a horizontal direction (a direction perpendicular to the paper surface of FIG. 11) is constituted in the similar manner to a longitudinal section of the display apparatus 7 in the vertical direction. Accordingly, in the backlight chassis 85, a right plate part 85*c*, a lower plate part 85*d* and a left plate part 85*e* (see FIG. 12C) formed in the similar shape to the upper plate part 85*b* protrude from the respective edge portions of the right side, lower side and left side of the support plate 85*a* to the front side (in the same direction). The pressing members 73 disposed on the right side, lower side and left side of the display apparatus 7 clamp and hold edge portions of the corresponding sides of the reflection sheet 82, the diffusion plate 81 and the optical sheet 80 with the right plate part 85*c*, the lower plate part 85*d* and the left plate part 85*e*, respectively. Further pressing members 73 disposed on the right side, lower side and left side of the display apparatus 7 clamp and hold the respective edge portions of the right side, lower side and left side of the display panel 70 with the front wall 71*b* of the bezel 71.

The peripheral wall 71*c* of the bezel 71 is located on the outside of the pressing members 73 disposed on the right side, lower side and left side of the display apparatus 7, and the backlight chassis 85.

Figure 12A:
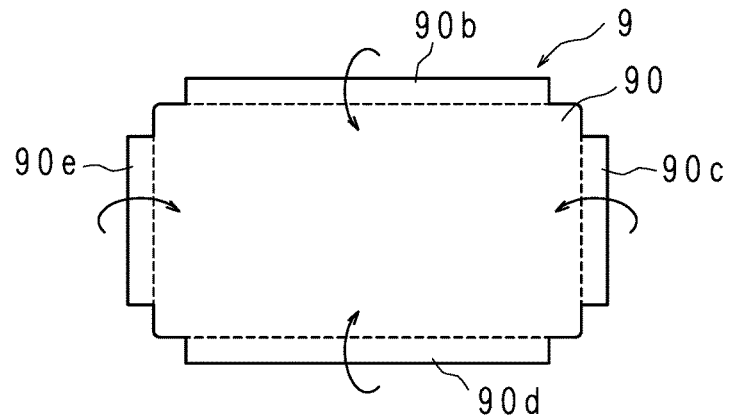
FIG. 12A is an explanatory view for describing the assembling of a backlight chassis.
Figure 12B:
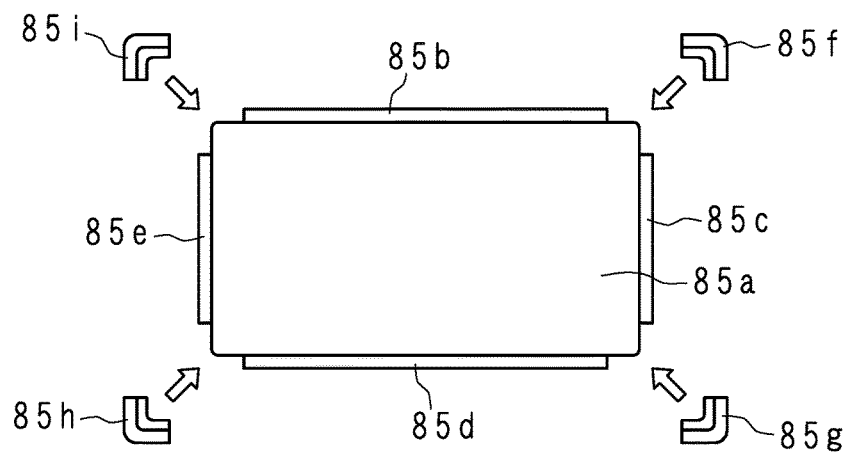
FIG. 12B is an explanatory view for describing the assembling of the backlight chassis.
Figure 12C:
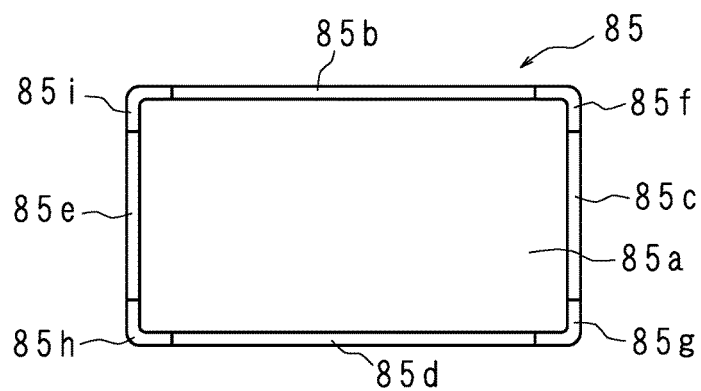
FIG. 12C is an explanatory view for describing the assembling of the backlight chassis.

FIGS. 12A, 12B and 12C are explanatory views for describing the assembling of the backlight chassis 85. The backlight chassis 85 is a pressed product of a metal plate 9 illustrated in FIG. 12A. The metal plate 9 is an aluminum plate, for example. The metal plate 9 has a rectangular flat plate 90, and protrusion parts 90*b*, 90*c* 90*d* and 90*e* of a rectangular-plate shape protruding respectively from the end surfaces of the flat plate 90. Dashed lines illustrated in FIG. 12A are folding lines, along each of which folding is performed in the process of pressing.

The protrusion parts 90*b*, 90*c*, 90*d* and 90*e* of the metal plate 9 illustrated in FIG. 12A are pressed along the folding lines so that the support plate 85*a*, the upper plate part 85*b*, the right plate part 85*c*, the lower plate part 85*d* and the left plate part 85*e* of the backlight chassis 85, illustrated in FIG. 12B are formed. The flat plate 90 and the protrusion parts 90*b*, 90*c* 90*d* and 90*e* correspond to the support plate 85*a*, the upper plate part 85*b*, the right plate part 85*c*, the lower plate part 85*d* and the left plate part 85*e*, respectively.

Adjacent respective one ends of the upper plate part 85*b* and the right plate part 85*c* are connected by a connecting part 85*f*, adjacent respective one ends of the right plate part 85*c* and the lower plate part 85*d* are connected by a connecting part 85*g*, adjacent respective one ends of the lower plate part 85*d* and the left plate part 85*e* are connected by a connecting part 85*h*, and adjacent respective one ends of the upper plate part 85*b* and the left plate part 85*e* are connected by a connecting part 85*i*. Thereby, the backlight chassis 85 illustrated in FIG. 12C is formed. Each of the connecting parts 85*f*, 85*g*, 85*h* and 85*i* is non-transparent.

Figure 13:
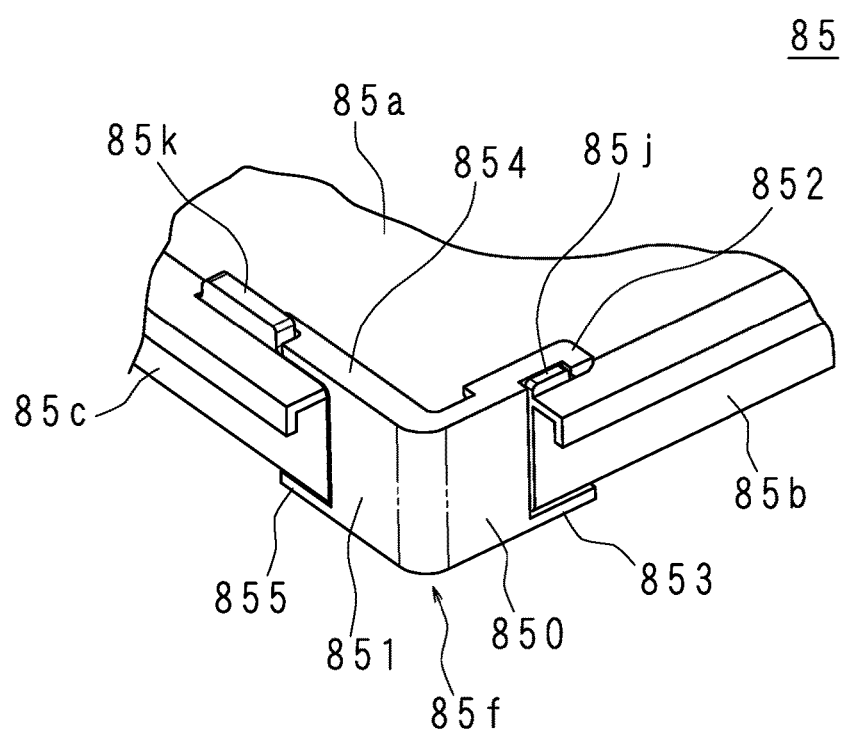
FIG. 13 is a perspective view of a corner portion of the backlight chassis as seen from the outside.
Figure 14:
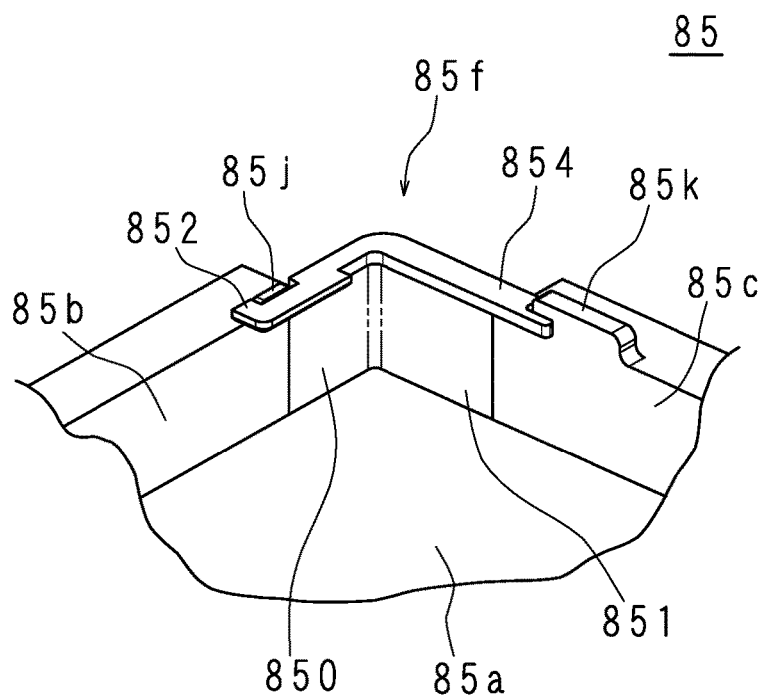
FIG. 14 is a perspective view of the corner portion of the backlight chassis as seen from the inside.

FIGS. 13 and 14 are perspective views of a corner portion of the backlight chassis 85 as seen from the outside and inside, respectively. FIGS. 13 and 14 illustrate a state in which the connecting part 85*f* connects a right end of the upper plate part 85*b* and an upper end of the right plate part 85*c* in the backlight chassis 85. The connecting part 85*f* is constituted in the similar manner to the connecting part 64 of FIG. 6 according to Embodiment 1. The connecting part 85*f* has two rectangular plate parts 850 and 851, and one long side of the plate part 850 is integrally formed with the one long side of the plate part 851. The connecting part 85*f* is formed in an L shape as a whole. The plate part 850 is provided with two protrusion parts 852 and 853 protruding from both end portions of the other long side of the plate part 850 in a short-length direction of the plate part 850. The protrusion part 852 is formed in a hook shape. In addition, the plate part 851 is provided with two protrusion parts 854 and 855 protruding from both end portions of the other long side of the plate part 851 in the short-length direction of the plate part 851. The protrusion part 854 is provided with a notch on an outside of a tip portion thereof.

As illustrated in FIGS. 13 and 14, the protrusion parts 852 and 854 of the connecting part 85*f* are located on the front side, and the protrusion parts 853 and 855 of the connecting part 85*f* are located on the rear side in the backlight chassis 85. In addition, the right end portion of the upper plate part 85*b* is provided with a protrusion 85*j* protruding to the front side, that is, to the side close to the display panel 10. The protrusion part 852, having a hook shape, of the connecting part 85*f* is engaged with the protrusion 85*j* of the upper plate part 85*b*. Here, the protrusion part 852 is in contact with the protrusion 85*j* from the inside, that is, the side close to the LED substrate 84. In addition, the protrusion parts 852 and 853 of the connecting part 85*f* clamp and hold the upper plate part 85*b* in the front-rear direction, that is, in the direction perpendicular to the front surface of the diffusion plate 81 in the backlight chassis 85.

Further, the upper end portion of the right plate part 85*c* is also provided with a protrusion 85*k* protruding to the front side. The notch provided in the tip portion of the protrusion part 854 of the connecting part 85*f* abuts the protrusion 85*k* of the right plate part 85*c*. The protrusion part 854 is in contact with the protrusion 85*k* from the inside, that is, the side close to the LED substrate 84. Furthermore, the protrusion parts 854 and 855 of the connecting part 85*f* clamp and hold the right plate part 85c in the front-rear direction, that is, in the direction perpendicular to the front surface of the diffusion plate 81.

In the backlight chassis 85 constituted as described above, the adjacent respective one ends of the upper plate part 85b and the right plate part 85c are connected by the non-transparent connecting part 85f so that a gap does not occur between the upper plate part 85b and the right plate part 85c. Therefore, it is prevented that light emitted by the plurality of LEDs 83 leaks from an upper right corner portion of the backlight chassis 85. Furthermore, it is also prevented that dust enters from the space between the upper plate part 85b and the right plate part 85c. Since the light leakage and entering of dust are prevented, there is no need to stick a non-transparent tape to the bezel 71.

In addition, the connecting part 85f clamps and holds the upper plate part 85b and the right plate part 85c in the front-rear direction so that it is possible to prevent the upper plate part 85b and the right plate part 85c from moving in the front-rear direction, without using the fixture, for example, screws. Further, the protrusion part 852 of the connecting part 85f is in contact with the upper plate part 85b at the inside thereof, and the protrusion part 854 of the connecting part 85f is in contact with the right plate part 85c at the inside thereof so that the connecting part 85f does not rotate in a direction perpendicular to one surface of the plate part 850 or the plate part 851. Therefore, the connecting part 85f is reliably fixed between the upper plate part 85b and the right plate part 85c.

Further, the connecting part 85f covers the rear side of the right edge portion of the upper plate part 85b, and the rear side of the upper edge portion of the right plate part 85c so that the light leakage and entering of dust from the upper right corner portion of the display apparatus 7 are more reliably prevented.

Each of the connecting parts 85g, 85h and 85i is constituted in the similar manner to the connecting part 85f. Lower right, lower left and upper left corner portions of the backlight chassis 85 are constituted in the similar manner to the upper right corner portion in which the connecting part 85f is disposed. Here, each of the left end portion of the upper plate part 85b, and the right end portion and the left end portion of the lower plate part 85d is provided with a protrusion corresponding to the protrusion 85j provided on the right end portion of the upper plate part 85b. Each of the lower end portion of the right plate part 85c, and the upper end portion and the lower end portion of the left plate part 85e is provided with a protrusion corresponding to the protrusion 85k provided on the upper end portion of the right plate part 85c. Each of the connecting parts 85g, 85h and 85i performs connection in the similar manner to the connecting part 85f.

Accordingly, in the lower right, lower left and upper left corner portions of the backlight chassis 85 connected by the connecting parts 85g, 85h and 85i respectively, the similar effect to the upper right corner portion of the backlight chassis 85 can be obtained.

It is noted that the connecting part 85f may not be in contact with the upper plate part 85b at the inside thereof and the right plate part 85c at the inside thereof in the backlight chassis 85 of Embodiment 2. Similarly, each of the connecting parts 85g, 85h and 85i may not also be in contact with two plate parts to be connected among the upper plate part 85b, the right plate part 85c, the lower plate part 85d and the left plate part 85e at the insides thereof. Furthermore, the connecting part 85f may not clamp and hold the upper plate part 85b and the right plate part 85c. Similarly, each of the connecting parts 85g, 85h and 85i may not also clamp and hold two plate parts to be connected among the upper plate part 85b, the right plate part 85c, the lower plate part 85d and the left plate part 85e. Even in the above-described cases, the respective one ends of the upper plate part 85b, the right plate part 85c, the lower plate part 85d and the left plate part 85e are connected by the connecting parts 85f, 85g, 85h and 85i in the backlight chassis 85 so that it is possible to prevent the light leakage and entering of dust.

The configuration of connecting the respective one ends of the two plate parts among the upper plate part 85b, the right plate part 85c, the lower plate part 85d and the left plate part 85e is not limited to the direct type backlight device such as the backlight device 8, and may be applied to the edge light type backlight device including the backlight chassis, one surface of which is open, such as the backlight chassis 85. Further, also in the case of forming the box body, one surface of which is open, by a heat dissipation plate and the backlight chassis, one ends of two side walls of the backlight chassis are connected by using the similar connecting part to the connecting part 85f so that the similar effect to the upper right corner portion of the backlight chassis 85 can be obtained.

For example, the lower left and upper left corner portions of the backlight chassis 60 according to Embodiment 1 may be constituted in the similar manner to the lower left and upper left corner portions of the backlight chassis 85 according to Embodiment 2, respectively. Here, the optical sheet 50, the light guide plate 51, the reflection sheet 52 and the plurality of LEDs 53 according to Embodiment 1 function as the light source unit in the claims. Also in the backlight chassis 60 constituted as described above, the light leakage and entering of dust from each of the lower left and upper left corner portions are prevented.

In addition, the display apparatus 7 may not be provided with all of the connecting parts 85f, 85g, 85h and 85i. For example, the connecting parts 85f and 85i may be provided at the upper right and upper left corner portions of the display apparatus 7 having a high probability of leaking light and entering dust, and the connecting part may not be provided at the lower right and lower left corner portions of the display apparatus 7 having a low probability of leaking light and entering dust.

DESCRIPTION OF REFERENCE CODES

It is noted that, as used herein and in the appended claims, the singular forms "a", "an", and "the" include plural referents unless the context clearly dictates otherwise.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A backlight device, comprising:
   a light guide plate for emitting light from one flat surface of the light guide plate, the light being made incident on one end surface of the light guide plate;
   a light source for emitting the light to the one end surface of the light guide plate;
   a heat dissipater for dissipating heat generated by the light source; and
   a support body for supporting the light guide plate, wherein the support body includes:

a cover plate for covering the other flat surface of the light guide plate; and a side wall provided continuously to the cover plate, for covering an end surface of the light guide plate adjacent to the one end surface of the light guide plate, and wherein the heat dissipater includes a side wall for covering the one end surface of the light guide plate, the backlight device further comprising a non-transparent connecting part for connecting adjacent one ends of the respective side walls of the support body and the heat dissipater wherein the connecting part includes:

a first plate part;

two protrusion parts protruding from the first plate part;

a second plate part; and two protrusion parts protruding from the second plate part, wherein one side of the first plate part is integrally formed with one side of the second plate part and the connecting part is formed in an L shape, wherein the two protrusion parts protruding from the first plate part clamp and hold the side wall of the support body in a direction perpendicular to the one flat surface of the light guide plate, wherein a portion of one of the two protrusion parts protruding from the first plate part is in contact with the side wall of the support body from the side close to the light guide plate, wherein the two protrusion parts protruding from the second plate part clamp and hold the side wall of the heat dissipater in the direction perpendicular to the one flat surface of the light guide plate, and wherein a portion of one of the two protrusion parts protruding from the second plate part is in contact with the side wall of the heat dissipater from the side close to the light plate side.

2. The backlight device according to claim 1, wherein the side wall of the support body is provided with a protrusion protruding from the side wall of the support body, and wherein the connecting part is engaged with the protrusion.

3. A display apparatus comprising:

a display panel for displaying an image; and the backlight device according to claim 1 for irradiating the display panel with light.

* * * * *